US007477138B2

(12) United States Patent
Taki et al.

(10) Patent No.: US 7,477,138 B2
(45) Date of Patent: Jan. 13, 2009

(54) FUNCTION OPERATION WARNING DEVICE

(75) Inventors: Naoki Taki, Okazaki (JP); Takeshi Matsumura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 187 days.

(21) Appl. No.: 11/406,264

(22) Filed: Apr. 19, 2006

(65) Prior Publication Data

US 2006/0255922 A1 Nov. 16, 2006

(30) Foreign Application Priority Data

May 11, 2005 (JP) ............................ 2005-138613

(51) Int. Cl.
*B60Q 1/00* (2006.01)

(52) U.S. Cl. ................. 340/438; 340/425.5; 340/426.1; 340/426.13; 340/426.16; 340/426.17; 340/426.22; 340/426.23

(58) Field of Classification Search .............. 340/425.5, 340/426.1, 426.13, 426.16, 426.17, 426.22, 340/426.23, 438
See application file for complete search history.

(56) References Cited

U.S. PATENT DOCUMENTS 6,363,324 B1 * 3/2002 Hildebrant .................. 701/213
6,738,712 B1 * 5/2004 Hildebrant .................. 701/213

FOREIGN PATENT DOCUMENTS

JP A 2004-80884 3/2004
JP A 2005-1573 1/2005

* cited by examiner

*Primary Examiner*—Daryl C Pope
(74) *Attorney, Agent, or Firm*—Oliff & Berridge, PLC

(57) ABSTRACT

A function operation warning device according to the invention includes a receiving portion that receives a control signal transmitted from an external remote transmitter; a definition portion that stores information that is used to determine whether an audible warning is generated in response to the control signal; an audible warning setting portion that stores settings concerning at least one of enable/disable of generation of the audible warning and a sound volume; a warning determination portion that determines, using the definition portion, whether the audible warning is generated, when the control signal is received; and a warning generation portion that generates the audible warning at a predetermined sound volume regardless of the settings stored in the audible warning setting portion, when the audible warning is generated as a result of determination made by the warning determination portion.

18 Claims, 3 Drawing Sheets

FUNCTION OPERATION WARNING DEVICE

INCORPORATION BY REFERENCE

The disclosure of Japanese Patent Application No. 2005-138613 filed on May 11, 2005 including the specification, drawings and abstract is incorporated herein by reference in its entirety.

BACKGROUND OF THE INVENTION

1. Field of the Invention

The invention relates generally to a function operation warning device that generates an audible warning, and, more specifically to a function operation warning device that generates an audible warning depending on a type of vehicle function operated through a remote operation.

2. Description of the Related Art

Vehicles equipped with remote operation functions that enable certain vehicle functions to be executed from remote locations are known. However, when a movable portion of the vehicle (a door or a window) is operated remotely, the movable portion may come in contact with an obstacle near the movable portion, causing a problem.

For example, Japanese Patent Application Publication No. JP-A-2005-001573 describes a door opening/closing device that restricts the operation of a movable portion in order to prevent such a problem caused by erroneously operating the movable portion. Because the door opening/closing device described in this publication operates the movable portion when operation for opening/closing the movable portion is performed twice or more, erroneous remote operation to drive the movable portion can be suppressed.

Also, when the movable portion is operated through the remote operation, a warning beep or an audible warning may be generated to call attention of an obstacle near the vehicle. If the attention can be attracted, the obstacle near the vehicle pays attention to the movement of the movable portion. It is, therefore, possible to avoid the problem due to contact with the movable portion.

However, it is sometimes not appropriate to generate a warning beep or an audible warning. Accordingly, the user can arbitrarily set enable/disable of generation of a warning beep or an audible warning, and the sound volume. Therefore, when generation of a warning beep or an audible warning has been disabled, even if the movable portion is operated through the remote operation, a warning beep or an audible warning for calling attention is not generated.

Enable/disable of generation of a warning beep or an audible warning may be set through the remote operation. However, adding such setting function complicates the specifications, resulting in a cost increase. In addition, the user needs to perform the operation for enabling generation of a warning beep or an audible warning before driving the movable portion, which complicates the operation by the user.

SUMMARY OF THE INVENTION

A first aspect of the invention relates to a function operation warning device including a receiving portion (for example, a receiving device) that receives a control signal transmitted from an external remote transmitter; a definition portion that stores information that is used to determine whether an audible warning is generated in response to the control signal; an audible warning setting portion that stores settings concerning at least one of enable/disable of generation of an audible warning and a sound volume; a warning determination portion (for example, a controller) that determines, using the definition portion, whether an audible warning is generated, when the control signal is received; and a warning generation portion that generates an audible warning at a predetermined sound volume regardless of the settings stored in the audible warning setting portion, when an audible warning is generated as a result of determination made by the warning determination portion.

The function operation warning device according to the first aspect can reliably generate an audible warning for calling attention when a movable portion, for example, a window is operated through a remote operation.

A second aspect of the invention relates to a function operation warning method. According to the method, a control signal transmitted from a remote transmitter is received. It is then determined whether control instructed by the control signal may cause contact with an obstacle. If it is determined that the control may cause contact with an obstacle, whether an obstacle is near a vehicle is determined. If it is determined that an obstacle is near the vehicle, a predetermined audible warning is generated.

An audible warning generation device according to the invention, which includes an audible warning setting portion, an obstacle determination portion and a warning generation. The audible warning setting portion stores settings concerning at least one of enable/disable of generation of an audible warning and a sound volume. The obstacle determination portion receives a control signal, and that determines whether an obstacle is near a vehicle when control instructed by the received control signal may cause contact with the obstacle. The warning generation portion generates the audible warning at a predetermined sound volume regardless of the settings stored in the audible warning setting portion, when it is determined that an obstacle is near the vehicle.

A remote control system according to the invention, which includes a remote transmitter, a receiving portion, a definition portion, an audible warning setting portion, a warning determination portion and a warning generation portion. The remote transmitter is executed by which a vehicle function through a remote operation. The receiving portion receives a control signal transmitted from the remote transmitter. The definition portion stores information that is used to determine whether an audible warning is generated in response to the control signal. The audible warning setting portion stores settings concerning at least one of enable/disable of generation of the audible warning and a sound volume. The warning determination portion determines, using the definition portion, whether the audible warning is generated, when the control signal is received. The warning generation portion generates the audible warning at a predetermined sound volume regardless of the settings stored in the audible warning setting portion, when the audible warning is generated as a result of determination made by the warning determination portion.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein.

DETAILED DESCRIPTION OF THE EXAMPLE EMBODIMENTS

Hereafter, example embodiments of the invention will be described with reference to accompanying drawings.

Figure 1:
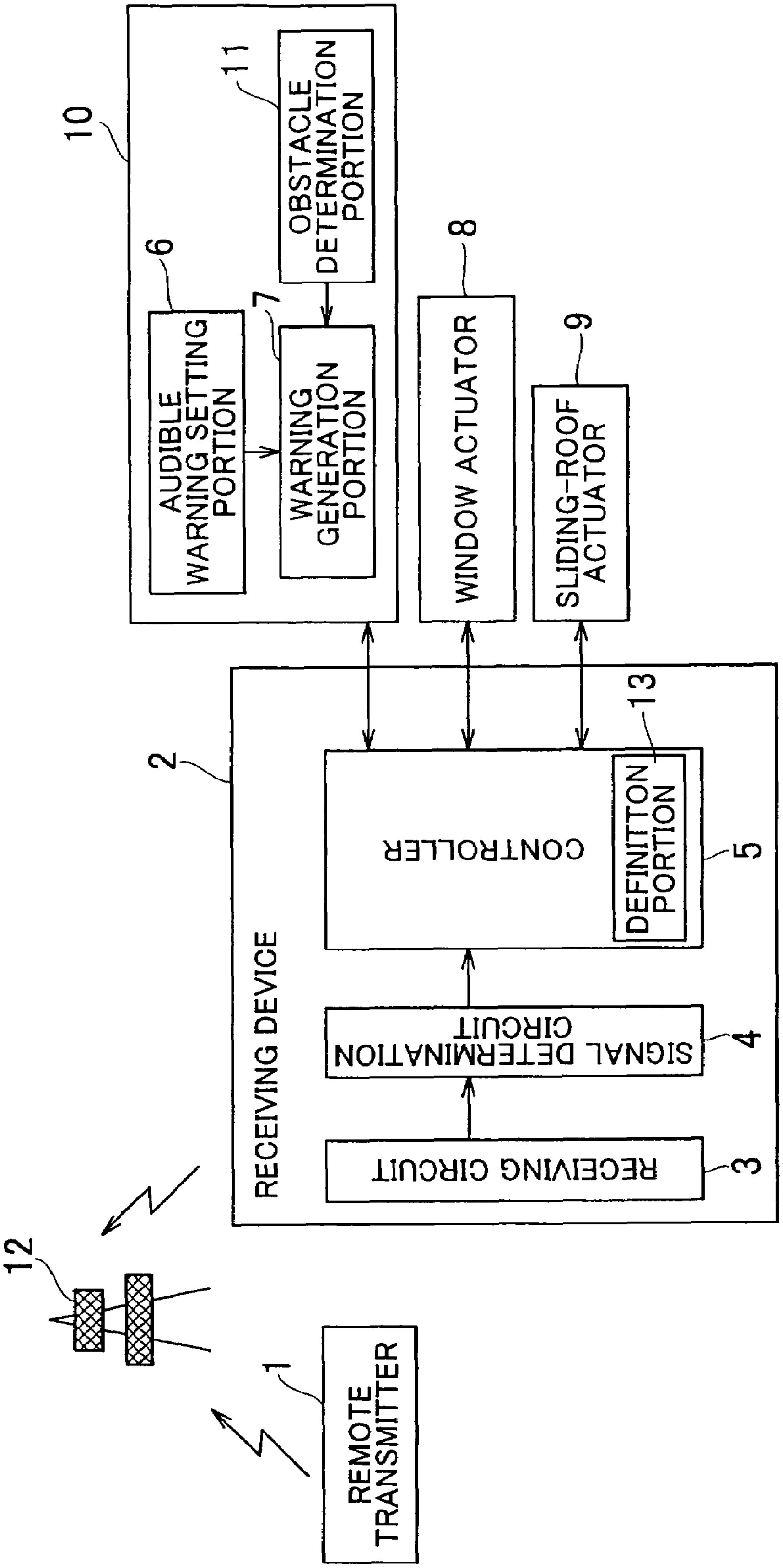
FIG. 1 illustrates the functional block diagram of a remote control system including a function operation warning device according to the invention, which generates an audible warning for calling attention when a vehicle is controlled through a remote operation.

A first embodiment of the invention will be described. FIG. 1 illustrates the functional block diagram of a remote control system including a function operation warning device that generates an audible warning for calling attention when a vehicle is controlled through a remote operation. Examples of audible warnings include warning beeps, warning melodies, and voice that can call attention.

In the remote control system in FIG. 1, a receiving device 2 receives a control signal transmitted from a remote transmitter 1 operated by a user (e.g. a driver). Then, a window actuator 8, a sliding-roof actuator 9, and a warning generation control portion 10 including an audible warning setting portion 6, a warning generation portion 7 and an obstacle determination portion 11 are controlled in response to the control signal.

The remote transmitter 1 may be a cellular-phone. The remote transmitter 1 transmits an operation signal in response to the operation of a manual operation button. The operation signal is transmitted to a center 12 via the cellular-phone network or another network, then transmitted from the center 12 to the receiving device 2 mounted in the vehicle of the user.

The receiving device 2 includes a receiving circuit 3 that receives the operation signal transmitted from the center 12. The receiving circuit 3 restores the original operation signal by demodulating the operation signal transmitted from the center 12. The restored operation signal is sent to a signal determination circuit 4. The signal determination circuit 4 determines the contents of the operation by the user. Then, a control signal corresponding to the result of determination is sent to a controller 5.

The controller 5 operates the window actuator 8, which opens or closes the window, or the sliding-roof actuator 9 in response to the control signal. When a predetermined movable portion is remotely operated, the controller 5 produces a warning signal for generating an audible warning for an obstacle near the vehicle, and sends the warning signal to the warning generation control portion 10.

The controller 5 includes a definition portion 13 that defines the remote operations that require generation of warning signals. When the control signal indicates the remote operation defined by the definition portion 13, the controller 5 produces a warning signal. The definition portion 13 defines, as the operations that require generation of warning signals, operations that may cause an obstacle near the vehicle to be caught in the movable portion or to be hit by the movable portion. Examples of such operations include the operations for opening/closing the window and sliding-roof, and the operations for opening/closing the door. Hereinafter, the operations, which may cause an obstacle near the vehicle to be caught in the movable portion or to be hit by the movable portion, will be referred to as "obstacle contacting operations".

When a warning signal is produced, the warning generation control portion 10 keeps generating an audible warning for a predetermined time. Then, the controller 5 controls the window actuator 8 or the sliding-roof actuator 9 to open or close the window or the sliding-roof, respectively.

When an audible warning is generated, a signal indicating that the audible signal has been generated is transmitted from a predetermined transmission device to the remote transmitter 1 operated by the user through the center 12. Thus, the user can confirm that operation of the movable portion that may contact an obstacle near the vehicle is started after calling attention of the obstacle.

Next, the warning generation control portion 10 will be described. The warning generation control portion 10 includes the audible warning setting portion 6 that makes settings for an audible warning; the warning generation portion 7 that generates an audible warning; and the obstacle determination portion 11 that determines whether an obstacle is near the vehicle.

The user sets enable/disable of generation of an audible warning and the sound volume of an audible warning, using the audible warning setting portion 6 as an interface. The audible warning setting portion 6 stores these settings. The warning generation portion 7 generates an audible warning based on the settings.

For example, when the obstacle contacting operation is performed by the user in the vehicle, the user can visually check whether an obstacle is near the vehicle. Accordingly, generation of an audible warning is controlled based on the settings, set by the user in advance, concerning enable/disable of generation of an audible warning and the sound volume.

In contrast to this, when the obstacle contacting operation is performed through the remote operation, the user cannot visually check whether an obstacle is near the vehicle. Accordingly, even when an obstacle is near the vehicle, if generation of an audible warning has been disabled, or the sound volume is set to a low volume, for example, attention of an obstacle near the vehicle cannot be called. In contrast, the warning generation control portion 10 according to the first embodiment makes it possible to generate an audible warning at a sufficiently high volume (for example, at the maximum volume) regardless of the settings stored in the audible warning setting portion 6, when the obstacle contacting operation is performed through the remote operation. Accordingly, when a warning signal is sent from the receiving device 2, the warning generation portion 7 generates an audible warning at the maximum volume, even if generation of an audible warning has been disabled based on the settings stored in the audible warning setting portion 6.

If it is obvious that there is no obstacle near the vehicle, an audible warning need not be generated. Accordingly, the obstacle determination portion 11 determines whether an obstacle is near the vehicle, and sends a signal indicating the result of determination to the warning generation portion 7.

The obstacle determination portion 11 determines whether an obstacle is near the vehicle based on 1) the result of detection by image recognition, 2) the result of detection by radar such as a clearance sonar, 3) the result of detection by a temperature sensor, and 4) the result of detection of a load applied to the vehicle.

Also, the obstacle determination portion 11 determines whether the user is near the vehicle based on 1) the result of detection of the position of the remote transmitter 1, and 2) the result of determination as to whether a key for keyless entry (Smart Key™) is near the vehicle.

In the detection by the image recognition, the image of the area around the vehicle is captured by an image capturing device such as a camera. If the captured image matches at least one of the image patterns of obstacles (e.g. alignment of eyes, a nose and a mouth), it is determined that an obstacle is near the vehicle. In the detection by radar such as a clearance sonar, an ultrasonic wave or an electric wave is emitted. It is then determined whether an obstacle is near the vehicle based on the reflected wave of the ultrasonic wave or the electric wave. In the detection by the temperature sensor, if there is an obstacle contacting the vehicle, it is determined that an obstacle is near the vehicle due to detection of the temperature of the obstacle. It is determined whether an obstacle is present using a non-contact thermometer or an infrared monitor.

In the detection of a load applied to the vehicle, it is determined whether a load is applied to the vehicle based on an amount of change in the value detected by a vehicle height sensor or a stroke sensor provided to each wheel. When a load applied to the vehicle is detected, and an occupant determination sensor, which determines whether a person is in the vehicle (an infrared sensor or a sensor that detects a load applied to seats), determines that a person is not in the vehicle, it is determined that there is an obstacle on the vehicle. Because the sliding-roof is provided in the roof of the vehicle, if the occupant determination sensor determines that a person is not in the vehicle, whether an obstacle is near the sliding-roof can be determined by detecting the load applied to the vehicle. If the user is in the vehicle, the weight of the user is detected as the load applied to the vehicle. However, the user in the vehicle can visually recognize as an obstacle. The person inside the vehicle is not considered as an obstacle. Accordingly, when the occupant determination sensor determines that a person is in the vehicle, even if the load applied to the vehicle is detected, it is not determined that an obstacle is present on the vehicle.

Also, whether an obstacle (the user, in this case) is near the vehicle can be determined based on the position of the remote transmitter 1 and the result of determination as to whether the key for keyless entry is near the vehicle. The current position of the vehicle can be detected by a GPS (Global Positioning System) mounted in the vehicle. Also, the remote transmitter 1 detects the position of the remote transmitter 1 using at least one of the GPS and the radio field strength between the remote transmitter 1. Because the remote transmitter 1 transmits the positional information along with the operation signal to the receiving device 2, the obstacle determination portion 11 can calculate the distance between the remote transmitter 1 and the vehicle, and determine whether an obstacle (the user, in this case) is near the vehicle.

In the determination as to whether the key for keyless entry is near the vehicle, an electric wave is first transmitted from the vehicle over short distances. Then, whether the key for keyless entry is near the vehicle is determined based on a specific ID code transmitted in response to the electric wave. It is, thus, possible to determine whether an obstacle (the user, in this case) is near the vehicle.

When it is determined that the remote transmitter 1 or the key for keyless entry is near the vehicle, the orientation of the face of the user detected by the image capturing device such as the camera is checked. Thus, it is possible to determine whether the user performs the remote operation using the remote transmitter 1 after checking whether an obstacle is near the vehicle. For example, if the user is facing the vehicle, it can be determined that the user performs the remote operation while visually checking whether an obstacle is near the vehicle. When the user is facing the vehicle, even if an obstacle is near the vehicle, it has been confirmed that the window or the like does not contact the obstacle. Accordingly, generation of an audible warning can be appropriately controlled, for example, an audible warning is not generated.

Figure 2:
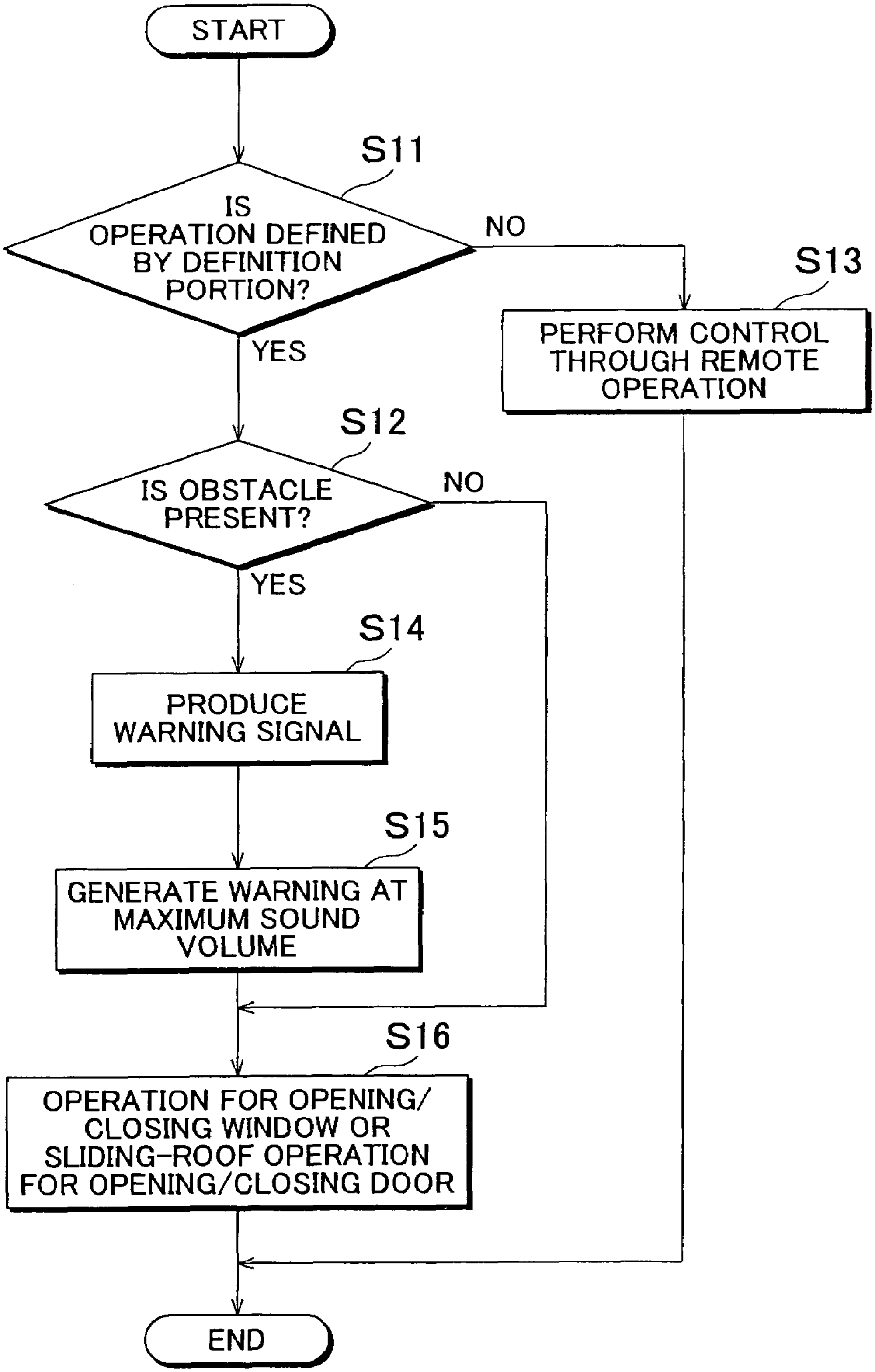
FIG. 2 illustrates an example of the flowchart of the process in which the function operation warning device generates an audible warning in the remote control system in FIG. 1.

FIG. 2 illustrates an example of the flowchart of the process in which the function operation warning device generates an audible warning. The process in FIG. 2 starts when an operation signal is transmitted from the remote transmitter 1 through the remote operation and the receiving device 2 receives the operation signal.

First, the signal determination circuit 4 sends a control signal corresponding to the received operation signal to the controller 5. The controller 5 then determines whether the contents of the remote operation match the obstacle contacting operation defined by the definition portion 13 (step S11).

If it is determined that the contents of the remote operation do not match any of the obstacle contacting operations defined by the definition portion 13 ("NO" in step S11), the movable portion that may contact the obstacle is not operated. Accordingly, the function operation warning device does not generate an audible warning, and performs the control instructed through the remote operation (for example, control for locking a door, control for executing the security function, and control for operating an air-conditioner) (step S13), after which the process in FIG. 2 ends.

If it is determined that the requested operation of the vehicle function by the remote operation matches the obstacle contacting operation defined by the definition portion 13 ("YES" in step S11), the obstacle determination portion 11 then determines whether an obstacle is near the vehicle (step S12). If it is determined that there is no obstacle near the vehicle ("NO" in step S12), the function operation warning devices does not generate an audible warning because it is not necessary. Then, the controller 5 drives the window actuator 8 or the sliding-roof actuator 9 in response to the operation signal transmitted through the remote operation (step S16).

If it is not clear whether an obstacle is near the vehicle, an audible warning is generated to avoid contact with the obstacle. Therefore, according to the first embodiment, if it is not clear whether an obstacle is near the vehicle, it is determined that an obstacle is near the vehicle. On the other hand, if it is clear that there is no obstacle near the vehicle, it is determined that there is no obstacle near the vehicle.

If it is determined that an obstacle is near the vehicle ("YES" in step S12), the controller 5 produces a warning signal that causes the warning generation control portion 10 to generate an audible warning (step S14). In response to the warning signal, the warning generation control portion 10 generates an audible warning regardless of the settings stored in the audible warning setting portion 6.

The warning generation portion 7 generates an audible warning at a predetermined sound volume (for example, maximum volume) based on the warning signal (step S15). Thus, an audible warning is generated at a sufficiently high volume regardless of the settings stored in the audible warning setting portion 6. The warning generation portion 11 keeps generating the audible warning for the predetermined time to call attention of the obstacle near the vehicle.

Next, the controller 5 operates the window actuator 8 or the sliding-roof actuator 9 corresponding to the window or the roof instructed to be opened or closed through the remote operation (step S16). Then, the process, in which the function operation warning device generates an audible warning when the obstacle contacting operation is performed through the remote operation, ends.

According to the first embodiment, even if generation of an audible warning has been disabled, when the movable portion that may contact the obstacle is driven through the remote operation, an audible warning can be generated at a sufficiently high volume. Accordingly, even if the user cannot visually check whether an obstacle is near the vehicle, an audible warning can be generated to avoid contact between the movable portion of the vehicle and the obstacle.

Next, a second embodiment of the invention will be described. In the second embodiment, the process shown in FIG. 3, instead of the process shown in FIG. 2, is performed in the system in FIG. 1 according to the first embodiment. In the second embodiment, description will be made concerning generation of an audible warning by the function operation warning device when the user visually checks whether an obstacle is near the vehicle and the obstacle contacting operation is performed through the remote operation.

Figure 3:
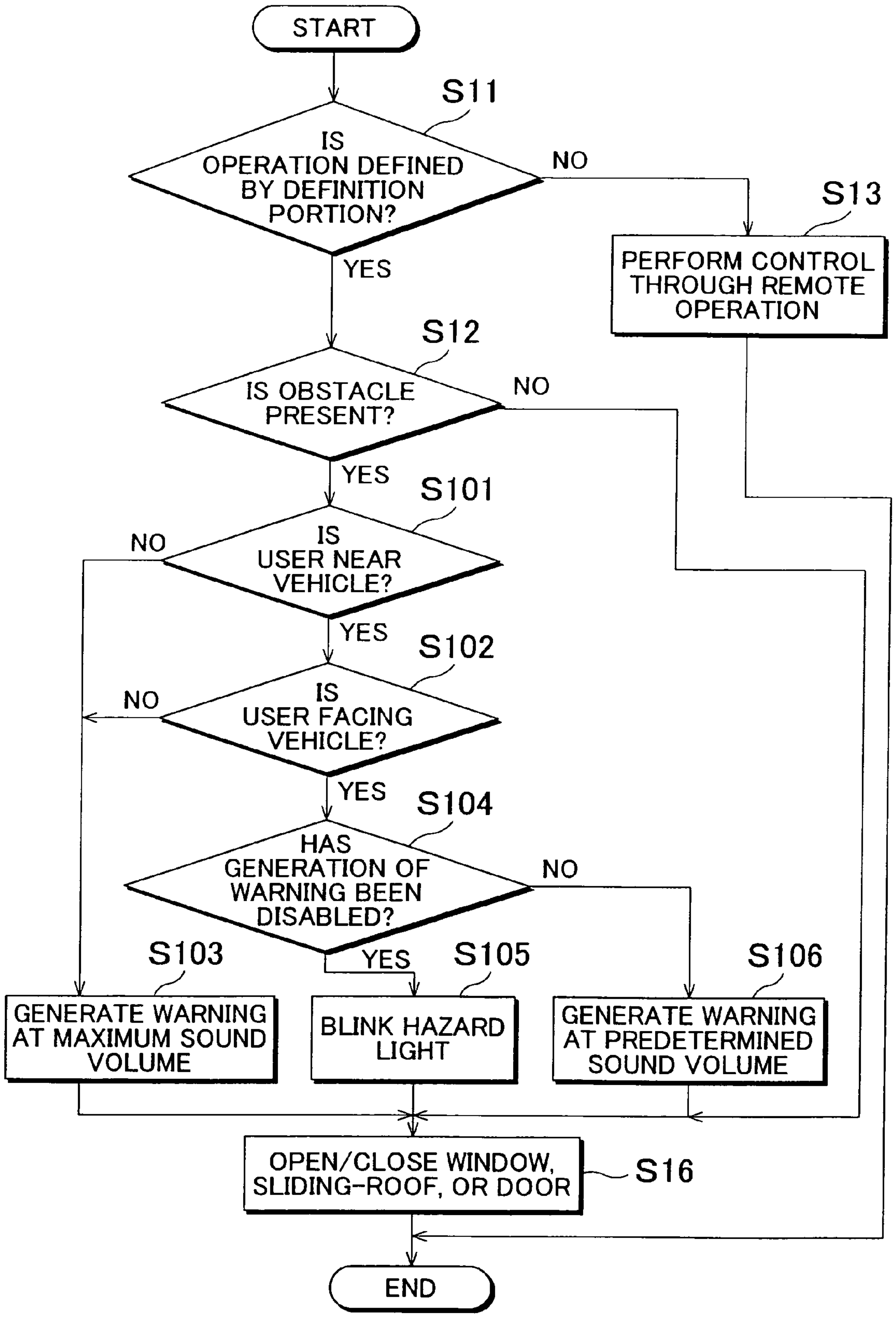
FIG. 3 illustrates another example of the flowchart of the process in which the function operation warning device generates an audible warning in the remote control system in FIG. 1.

FIG. 3 illustrates an example of the flowchart of the process in which the function operation warning device generates an audible warning. The steps corresponding to those in FIG. 2 are denoted by the same step numbers.

First, the signal determination circuit 4 determines the received operation signal, and sends it to the controller 5. The controller 5 determines, using the definition portion 13, whether the contents of the remote operation match the obstacle contacting operation defined by the definition portion 13 (step S11).

If it is determined that the contents of the remote operation do not match the obstacle contacting operation defined by the definition portion 13 ("NO" in step S11), the movable portion that may contact the obstacle is not operated. Accordingly, the function operation warning device does not generate an audible warning, and performs the control instructed through the remote operation (for example, control for locking a door and control for performing the security function) (step S13), after which the process in FIG. 3 ends.

If it is determined that the contents of the remote operation match the obstacle contacting operation defined by the definition portion 13 ("YES" in step S11), the obstacle determination portion 11 determines whether an obstacle is near the vehicle (step S12). If it is determined that there is no obstacle near the vehicle ("NO" in step S12), the function operation warning device does not generate an audible warning because it is not necessary. Then, the controller 5 drives the window actuator 8 or the sliding-roof actuator 9 (step S16).

If it is determined that an obstacle is near the vehicle ("YES" in step S12), the obstacle determination portion 11 then determines whether the user is near the vehicle (step S101). Whether the user is near the vehicle is determined based on the distance between the remote transmitter 1 and the vehicle or the result of determination as to whether the key for keyless entry is near the vehicle.

If it is determined that the user is near the vehicle ("YES" in step S101), it is then determined whether the user is facing the vehicle using the camera or the like (step S102).

If it is determined that the user is not near the vehicle ("NO" in step S101) or if it is determined that the user is not facing the vehicle ("NO" in step S102), it is not clear whether the user visually checks presence or absence of an obstacle near the vehicle. Also, the user may have erroneously performed the operation. Accordingly, as in the first embodiment, a warning signal is produced and an audible warning is generated at a sufficiently high volume.

If it is determined that the user is facing the vehicle ("YES" in step S102), it can be determined that the user visually checks whether an obstacle is near the vehicle. Accordingly, an audible warning is generated based on the settings that are set by the user and stored in the audible warning setting portion 6.

The warning generation portion 7 determines whether generation of an audible warning has been disabled based on the settings (step S104). If it is determined that generation of an audible warning has been disabled ("YES" in step S104), a hazard light of the vehicle is blinked (step S105). Blinking of the hazard light makes it possible to call attention to the movement of the movable operation of the vehicle.

If it is determined that generation of an audible warning is not disabled ("NO" in step S104), the warning generation portion 7 generates an audible warning at a sound volume based on the settings (step S106). Generating an audible warning makes it possible to call attention to the movement of the movable portion of the vehicle.

Next, the controller 5 drives the window actuator 8 or the sliding-roof actuator 9 corresponding to the window or the roof instructed to be opened or closed through the remote operation (step S16). Then, the process, which is performed by the function operation warning device when the obstacle contacting operation is performed through the remote operation and the user visually checks whether an obstacle is near the vehicle, ends.

According to the second embodiment, when it is determined that the user does not visually check whether an obstacle is near the vehicle, an audible warning is generated at a sufficiently high volume regardless of the settings concerning generation of an audible warning, as in the first embodiment of the invention. On the other hand, when it is determined that the user visually checks whether an obstacle is near the vehicle, a hazard light is blinked instead of generating an audible warning or an audible warning is generated at a predetermined sound volume based on the settings concerning generation of an audible warning. Accordingly, it is possible to call attention to the movement of the movable portion through the remote operation while following the settings, set by the user, concerning generation of an audible warning.

What is claimed is:

1. A function operation warning device, comprising:

a receiving portion that receives a control signal transmitted from a remote transmitter;

a definition portion that stores information that is used to determine whether an audible warning is generated in response to the control signal;

an audible warning setting portion that stores settings concerning at least one of enable/disable of generation of the audible warning and a sound volume;

a warning determination portion that determines, using the definition portion, whether the audible warning is generated, when the control signal is received; and a warning generation portion that generates the audible warning at a predetermined sound volume regardless of the settings stored in the audible warning setting portion, when the audible warning is generated as a result of determination made by the warning determination portion, wherein the settings concerning at least one of enable/disable of generation of the audible warning and the sound volume are able to be set by a user.

2. The function operation warning device according to claim 1, wherein, when a vehicle function is executed, the audible warning is generated depending on a type of the vehicle function executed.

3. The function operation warning device according to claim 2, further comprising:

an obstacle determination portion that determines whether an obstacle is near a vehicle, wherein, when the obstacle determination portion determines that the obstacle is near the vehicle, the audible warning generation portion generates the audible warning.

4. The function operation warning device according to claim 3, wherein the obstacle determination portion is provided with an image capturing device that captures an image of an area around the vehicle, and when a captured image matches at least one of image patterns of obstacles, the obstacle determination portion determines that the obstacle is near the vehicle.

5. The function operation warning device according to claim 3, wherein the obstacle determination portion is provided with radar, and determines whether the obstacle is near the vehicle by receiving a reflected wave of an ultrasonic wave or an electric wave emitted from the radar.

6. The function operation warning device according to claim 3, wherein the obstacle determination portion is provided with a temperature sensor, and determines whether the obstacle is near the vehicle by detecting a temperature of at least one of the vehicle and an area around the vehicle using the temperature sensor.

7. The function operation warning device according to claim 3, wherein the obstacle determination portion is provided with at least one of a vehicle height sensor and a stroke sensor, and determines whether the obstacle is near the vehicle by detecting an amount of change in a value indicated by at least one of the vehicle height sensor and the stroke sensor.

8. The function operation warning device according to claim 2, further comprising:

a user determination portion that determines whether a user of a vehicle is near the vehicle, wherein, when the user determination portion determines that the user is near the vehicle, the warning generation portion generates the audible warning based on the settings stored in the audible warning setting portion.

9. The function operation warning device according to claim 8, wherein the user determination portion determines whether the user is near the vehicle by detecting a distance between the vehicle and the remote transmitter based on a position of the vehicle detected by a GPS, and a position of the remote transmitter detected using at least one of the GPS and a radio field strength between the remote transmitter and a base station.

10. The function operation warning device according to claim 2, wherein the remote transmitter is a cellular-phone.

11. The function operation warning device according to claim 2, wherein the control signal is a signal for controlling at least one of an operation of a window of a vehicle and an operation of a sliding-roof of the vehicle.

12. The function operation warning device according to claim 2, wherein the predetermined sound volume is a maximum sound volume that can be set by the audible warning setting portion.

13. The function operation warning device according to claim 2, further comprising:

a user determination portion that determines whether a user is near a vehicle, and that determines whether the user is facing the vehicle, wherein, when the user determination portion determines that the user is near the vehicle and the user is facing the vehicle, the warning generation portion generates the audible warning based on the settings stored in the audible warning setting portion.

14. A function operation warning device, comprising:

receiving means for receiving a control signal transmitted from a remote transmitter;

definition means for storing information that is used to determine whether an audible warning is generated in response to the control signal;

audible warning setting means for storing settings concerning at least one of enable/disable of generation of the audible warning and a sound volume;

warning determination means for determining, using the definition portion, whether the audible warning is generated, when the control signal is received; and warning generation means for generating the audible warning at a predetermined volume regardless of the settings stored in the audible warning setting portion, when the audible warning is generated as a result of determination made by the warning determination portion, wherein the settings concerning at least one of enable/disable of generation of the audible warning and the sound volume are able to be set by a user.

15. A function operation warning method, comprising:

receiving a control signal transmitted from a remote transmitter;

determining whether control instructed by the control signal may cause contact with an obstacle;

determining whether an obstacle is near a vehicle, when it is determined that the control instructed by the control signal may cause contact with the obstacle; and generating a predetermined audible warning, when it is determined that the obstacle is near the vehicle.

16. An audible warning generation device, comprising:

an audible warning setting portion that stores settings concerning at least one of enable/disable of generation of an audible warning and a sound volume;

an obstacle determination portion that receives a control signal, and that determines whether an obstacle is near a vehicle when control instructed by the received control signal may cause contact with the obstacle; and a warning generation portion that generates the audible warning at a predetermined sound volume regardless of the settings stored in the audible warning setting portion, when it is determined that an obstacle is near the vehicle, wherein the settings concerning at least one of enable/disable of generation of the audible warning and the sound volume are able to be set by a user.

17. A remote control system, comprising:

a remote transmitter by which a vehicle function is executed through a remote operation;

a receiving portion that receives a control signal transmitted from the remote transmitter;

a definition portion that stores information that is used to determine whether an audible warning is generated in response to the control signal;

an audible warning setting portion that stores settings concerning at least one of enable/disable of generation of the audible warning and a sound volume;

a warning determination portion that determines, using the definition portion, whether the audible warning is generated, when the control signal is received; and a warning generation portion that generates the audible warning at a predetermined sound volume regardless of the settings stored in the audible warning setting portion, when the audible warning is generated as a result of determination made by the warning determination portion, wherein the settings concerning at least one of enable/disable of generation of the audible warning and the sound volume are able to be set by a user.

18. The remote control system according to claim 17, wherein the remote transmitter is used to operate the vehicle functions via a base station.

* * * * *